United States Patent
Ijzerman et al.

(10) Patent No.: US 7,561,131 B2
(45) Date of Patent: Jul. 14, 2009

(54) PASSIVE MATRIX DISPLAY WITH BISTABLE ELECTRO-WETTING CELLS

(75) Inventors: Willem Lubertus Ijzerman, Eindhoven (NL); Michel Cornelis Josephus Marie Vissenberg, Eindhoven (NL); Marcellinus Petrus Carolus Michael Krijn, Eindhoven (NL); Siebe Tjerk De Zwart, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 403 days.

(21) Appl. No.: 10/546,391

(22) PCT Filed: Feb. 18, 2004

(86) PCT No.: PCT/IB2004/050119

§ 371 (c)(1), (2), (4) Date: Aug. 18, 2005

(87) PCT Pub. No.: WO2004/077124

PCT Pub. Date: Sep. 10, 2004

(65) Prior Publication Data

US 2006/0077330 A1   Apr. 13, 2006

(30) Foreign Application Priority Data

Feb. 26, 2003   (EP)   ................... 03100460

(51) Int. Cl.
*G09G 3/36* (2006.01)

(52) U.S. Cl. .................. 345/87; 345/75.2; 345/81; 345/85; 345/103; 345/107

(58) Field of Classification Search ............ 345/30, 345/32, 97, 1.1–4, 75.2, 76, 84–85, 87–107, 345/204–215
See application file for complete search history.

(56) References Cited

U.S. PATENT DOCUMENTS

| 5,757,345 A * | 5/1998 | Sheridon ................. 345/84 |
| 6,603,444 B1 * | 8/2003 | Kawanami et al. ........... 345/32 |
| 6,911,132 B2 * | 6/2005 | Pamula et al. ............ 204/600 |

FOREIGN PATENT DOCUMENTS

| JP | 2000356750 A | 12/2000 |
| WO | WO02099527 A1 | 12/2002 |

* cited by examiner

*Primary Examiner*—Vijay Shankar (57) ABSTRACT

A display unit comprising electro-wetting pixels (1300) is provided. The inventive pixels (1300) provide bistable or multi-stable pixel states and thus facilitates passive matrix addressing. For this purpose an additional electrode (1305) is arranged for each multi-stable state. Consequently, each pixel comprises one counter electrode (1306) and at least one pair of address and retain electrodes (1304, 1305). In order to activate a pixel, an address potential is applied to the address and retain electrodes (1304, 1305) in relation to the counter electrode (1306), and in order to deactivate a pixel the potential is removed. In order to retain a current pixel state a retain potential is applied to only the retain electrode (1305) in relation to the counter electrode (1306); the current pixel state, be it active or passive, will then be preserved and the retain potential configuration thus provides a bistable pixel state.

14 Claims, 10 Drawing Sheets

PASSIVE MATRIX DISPLAY WITH BISTABLE ELECTRO-WETTING CELLS

The present invention relates to pixels based on electro wetting, and in particular to such pixels that are suited for passive matrix addressing.

Electro-wetting is essentially the phenomenon whereby an electric field modifies the wetting behavior of a polar liquid in contact with a hydrophobic surface. By applying an electric field, a surface energy gradient is created in the polar liquid, which can be used to manipulate the liquid. In common applications, water is used as the polar liquid.

Recently, optical elements (pixels) have been proposed and demonstrated to operate based on the principle of electro-wetting. Such optical elements typically consist of a closed cell that is filled with one part of water and one part of oil. Other liquids might also be used; the important characteristics are that they are immiscible and that one of them is polar (e.g. water) while the other one is non-polar (e.g. oil). Since the liquids are immiscible, a well-defined interface will always be present between them. The inner surface of the cell generally comprises two separate surfaces, one that is hydrophobic and one that is non-hydrophobic. The hydrophobic surface will by nature reject the water, and by configuring the surfaces properly the spatial relationship between the liquids can be predetermined, i.e. the water is forced to a predetermined location opposite the hydrophobic surface. Consequently, also the interface between the two liquids can be predetermined.

Furthermore two electrodes are arranged in the cell, one address electrode arranged behind the hydrophobic surface and one counter electrode that forms part of the non-hydrophobic surface and thus has electrical contact with at least one of the liquids. By applying a potential between the electrodes, an electric field is created across the liquids. The electric field gives rise to an electrostatic force that overrides the force of rejection exercised by the hydrophobic surface and thus modifies the spatial relation between the liquids and consequently also the position of the liquid interface. In effect, the liquid interface can be controlled by means of controlling the applied potential.

There are several known principles exploiting this mechanism and with which a pixel can be controlled. According to a first principle, the liquids are chosen to have different indices of refraction. This turns the meniscus between the liquids into a lens having refractive properties that can be controlled by means of the electrode potential. Typically, this lens can be changed between a convex, light focusing ON-state and a concave, light defocusing OFF-state. This type of pixel will in the following be referred to as a lens type of pixel.

According to a second principle, the liquids are instead chosen to have different colors and/or level of transparency. Basically, the color and/or brightness of the pixel is controlled by choosing which liquid that is to occupy the light path of the pixel, while the other liquid is moved away from the light path, partially or completely. Using this second principle, in the following referred to as a filter type of pixel, gray scales can be provided by means of additional electrodes, each additional electrode thus corresponding to an additional gray scale.

An electro-wetting pixel based on the lens principle is known from the patent application JP2000-356750. Still another type of electro-wetting pixels is described in WO 02/099527.

According to any of the above principles, the pixel characteristics can be controlled by means of the applied potential. Even though some application uses a variable potential, e.g. for providing gray scales, it is most commonly used for providing a distinct ON-state (or, possibly a discrete number of gray scales in a filter type pixel having additional electrodes), and a distinct OFF-state, applying certain potentials. However, as soon as the potentials are removed, the interface returns to its initial position. Thus, a matrix display with this type of pixels requires active matrix addressing.

For an active matrix display based on electro-wetting cells, one can use the capacity of the lens itself as a memory element. Once a certain potential is applied to the cell, the interface will not change. For such a display, an active matrix plate is needed, which is relatively expensive to manufacture.

In order to facilitate passive addressing, each pixel has to have a bistable state. A bistable state is a particular potential configuration in which the interface can be in more than one position, depending on its previous addressing history. In particular, when addressing a matrix of pixels one would like to have a potential configuration in which the pixel is in its ON-state in case is has previously been turned ON, and in its OFF-state in case it has previously been turned OFF. Such properties are not provided for in the prior art.

An object of the present invention is thus to provide bistable, electro-wetting pixels, which preferably can be addressed using passive addressing. This object is achieved by the present invention as defined in claim 1 and 13. Advantageous embodiments are provided by the appended sub-claims.

The surface energy gradient between the polar and the non-polar liquids is affected by the potentials applied to the electrodes. However, for the purpose of the invention it is recognized that the surface energy gradient depends mainly on the potential applied close to the triple point, i.e. the intersection of the liquid interface and the inner surfaces of the cell. Consequently, for the purpose of manipulating the surface energy gradient it suffices to apply a potential in the polar liquid close to the triple point. In particular, a desired surface location can be maintained by means of an electric field localized to a region in the proximity of the corresponding triple point, whereas the impact of a field change at a distance from the triple point is negligible. In other words, for the purpose of the invention it is recognized that the mechanism resulting in the electro-wetting phenomenon is localized to the near proximity of the triple point.

Based on the above recognition, it is further recognized that the provision of an additional electrode adjacent to an address electrode facilitates a bistable state in the pixel. In a sense, the additional electrode can be understood as a retain electrode intended for retaining a pixels state as opposed to the (conventional) address electrode which is intended for achieving said pixel state. The idea is to apply a potential to the address and retain electrodes that is different from the potential at the counter electrode. The address and retain electrodes are thus functioning as a single address electrode, in order to achieve the activated state, and subsequently to retain the activated state by means of a sole potential between the retain electrode and the counter electrode. Placing the retain electrode properly, the retain potential will not in itself activate the pixel. Thus, regardless if a pixel is currently in its active or passive state, the current state will be retained by the retain potential applied between the retain electrode and the counter electrode. Consequently, having the retain potential applied constitutes a bistable state in which the pixel might be active or passive, depending on its previously addressed state.

Thus, according to one aspect of the invention a display unit comprising at least one electro-wetting pixel is provided. Each electro-wetting pixel comprises:

a closed cell;

a polar liquid and a non-polar liquid, said liquids being immiscible, having different optical properties and being contained in said cell;

a counter electrode; and at least one electrode pair, each electrode pair comprising an address electrode and a retain electrode, said address and retain electrodes being separated from said liquids by a surface that is lyophobic in relation to only one of said liquids.

In each pixel, said address and retain electrodes are arranged at respective electric potentials to control a spatial distribution of said liquids and thereby defining a multi-stable pixel state.

In one preferred embodiment, said at least one electrode pair is arranged to provide one active multi-stable pixel state.

In one preferred embodiment, the display unit further comprises a control unit which is operative to apply potentials to the address and retain electrodes in relation to the counter electrode of each pixel; and to set each pixel in either of at least one active multi-stable pixel state, by means of an address potential applied to said address and retain electrodes in relation to the counter electrode of the respective pixel, and a passive multi-stable pixel state, by means of removing any potential from the address and retain electrodes in relation to the counter electrode of the respective pixel; and to retain a current multi-stable pixel state in each pixel by means of applying a retain potential to each retain electrode only of the respective pixel.

According to one embodiment, the display unit comprises a plurality of pixels, which are arranged along rows and columns in a matrix configuration.

According to one embodiment, each pixel further comprises at least one additional electrode pair, each pair comprising a retain electrode and an address electrode and each electrode pair providing for a multi-stable gray level. This embodiment is advantageous in that it provides for additional multi-stable pixel states. Preferably the display unit comprises a number of pixels.

According to one embodiment, every retain electrode within each pixel is electrically interconnected with each other. This is advantageous since the pixel circuitry thus can be reduced. In effect, the retain electrodes of each pixel can thus be controlled as one single electrode. In case the pixels are arranged in a matrix configuration, along rows and columns, it is also possible to electrically interconnect the retain electrodes of every pixel in each row (or column), such that there is only one retain electrode circuitry needed for each row (or column). Thereby the pixel circuitry can be reduced substantially and all the retain electrodes can of each row (or column) be controlled as one single electrode. It is also possible to interconnect the counter electrodes of every pixel in each row (or column), thus resulting in reduced counter electrode circuitry.

According to one embodiment, said liquids in each pixel have different indices of refraction and define a lens and wherein each pixel state is controlled by said lens. Preferably the pixels in such a display further comprises a light guide, and are the electrodes operative to move the lens between an ON state in which the lens is operative to focus light from the light guide towards an exit surface of the cell and an OFF state in which the lens is operative to spread light from the light guide away from the exit surface. This embodiment thus provides for display unit having lens type pixels.

According to another embodiment, said liquids in each pixel have different light filtering properties and the spatial distribution of the liquids provides a controllable light filter which defines said pixel state. Preferably the cell of each pixel in such a display defines a vertical light path and are the address and retain electrodes are arranged essentially transversal to said light path. This embodiment thus provides for a display unit having filter type pixels.

One preferred polar liquid is water, in which case the lyophobic surface is in fact a hydrophobic surface. One preferred non-polar liquid is oil. Regardless of which types of liquids that are used, it is preferred to choose liquids having about the same density so as to eliminate any gravitational effect on the spatial distribution of the liquids. Another aspect of the invention provides a method for bistable addressing of at least one electro-wetting pixel, each pixel comprising an address electrode, a retain electrode and a counter electrode, in which an active state is set by applying a potential to the address electrode and to the counter electrode in relation to the counter electrode; and in which a passive state is set by removing any potential from the address electrode and from the retain electrode in relation to the counter electrode.

The method further comprises the step of retaining a current state by applying a potential to the retain electrode in relation to the counter electrode and removing any potential from the address electrode in relation to the counter electrode.

According to one embodiment, a plurality of pixels in a display device are addressed during picture frames, the method comprising the consecutive steps of:

setting each pixel to an active state;

setting a subset of said pixels to a passive state; and retaining each pixel in its current state.

In case the pixels are arranged in a matrix configuration having rows and columns, the pixels are preferably addressed one row at a time.

The invention will now be described in further detail. In the following description, the wording "passive state" refers to a state in which the pixel is if no potentials are applied to the electrodes, i.e. the ground state. This is opposed to an "active state", in which the liquid distribution, and thus the position of the liquid interface, is changed in response to potentials applied to electrodes. Furthermore, when in the following discussing potentials, the potentials referred to are relative potentials in relation to the potential at the counter electrode. For example, a potential applied to the retain electrode is in effect a potential difference applied between the retain electrode and the counter electrode and when removing any potential from an electrode, the electrode is put to the same potential as the counter electrode. Of course, the counter electrode might itself have a certain potential in relation to any other structure.

The terms lyophilic (liquid-loving) and lyophobic (liquid-hating) describes the tendency of a surface to become wetted by a liquid. Hydrophilic and hydrophobic refers to the particular case when the liquid is aqueous. In the following embodiments, oil and water are used as the non-polar and polar liquids. Consequently, the terms hydrophobic and hydrophilic are used. However, it should by understood that any combination of liquids and surfaces which provides the necessary combination of polarity and non-polarity and lyophobic/lyophilic effect, respectively, can be used instead.

Furthermore, even though every inventive pixel is based on the same inventive idea, the following description is divided into two parts. A first part concerns pixels in which the liquid interface functions as a lens, here denoted Type 1 pixels, and a second part concerns pixels in which the liquids functions as a light filter, here denoted Type 2 pixels.

Type 1 (Lens Type)

Figure 1:
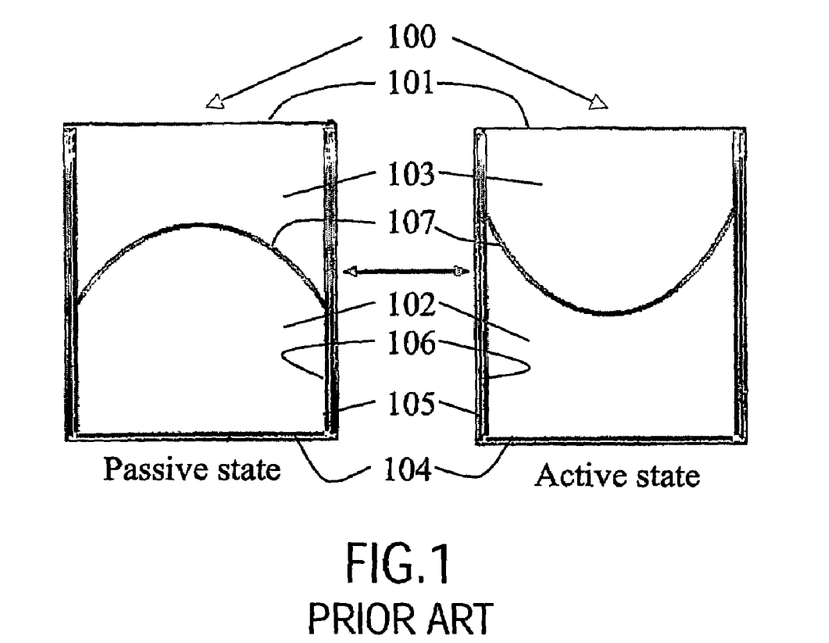
FIG. 1 illustrates a lens type electro-wetting pixel in a passive state (left) and an active state (right).

A sketch of two prior art Type 1 electro-wetting lenses 100 is shown in FIG. 1. Each lens 100 comprises a closed cell 101 in which two immiscible and transparent liquids 102, 103, are located. A first liquid 102 is polar, such as water, and a second liquid is non-polar, such as oil. The indices of refraction of these liquids are chosen to differ, while their density are similar in order to avoid gravitational effects. The cell is typically cylindrical. On the inner side of the cell 101 there are two cylindrical electrodes, a first electrode 104 which is in contact with the polar liquid 102 and a second electrode 105 which is insulated from the polar liquid 102 by means of a hydrophobic coating 106. At their interface, the liquids defines a lens 107 which is controllable by means of a potential applied between the two electrodes 104, 105:

1. If no potential difference is applied between the electrodes, the polar liquid 102 minimizes its contact area with the hydrophobic coating 106. Consequently, the lens is in a passive state (left picture). In this particular embodiment, the lens 107 is concave.
2. In case a potential is applied between the two electrodes, the contact area changes. The polar liquid and the electrode form a capacitor and it is more favorable for the system to increase the contact area between the polar liquid and the hydrophobic coating. In this active state, the lens thus becomes less concave or even convex if a sufficiently high potential difference is applied.

Consequently, by means of electro-wetting the lens 107 can be changed at will from convex to concave, and vice versa, by means of applying a single potential between electrode 104 and 105. In practice, it is sufficient to use potential differences in the order of tens of volts, the exact potential depending on the thickness of the hydrophobic coating. The polarity of the potential difference is of no importance.

Of course, the degree of lens manipulation depends on the potential level applied. However, in order to simplify the description only three potentials will be contemplated, 0, + and ++, where + denotes a potential higher than 0, and ++ denotes an even higher potential. In the following discussion, the absolute value of the potentials is of no interest for the described mechanisms and principles.

Figure 2:
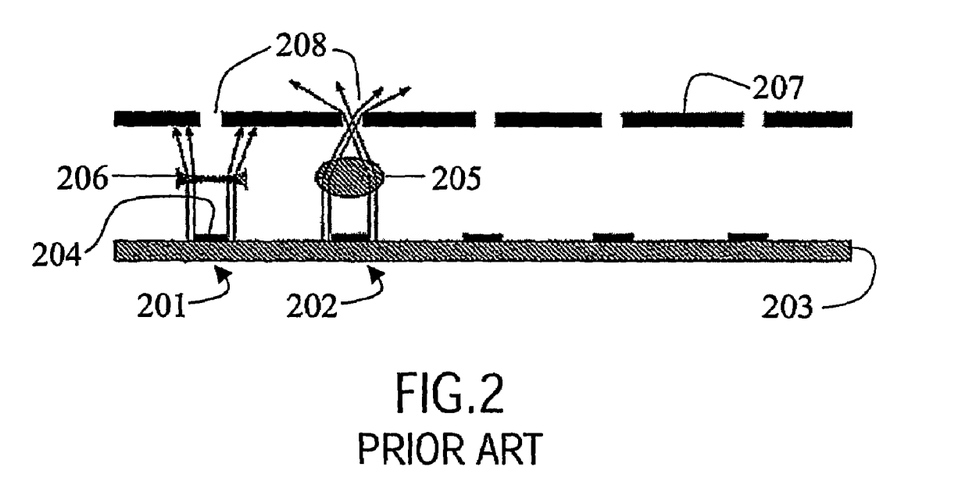
FIG. 2 schematically shows a display comprising electro-wetting pixels of the type shown in FIG. 1.

FIG. 2 shows pixels 201, 202 based on electro-wetting and arranged in a display configuration. The display configuration comprises a collimated back light 203, an electro-wetting lens 205, 206 of the above described type, and a front cover 207 in which exit pupils 208 defines the location of the pixel. A cover 204 blocks the center of the lens in each pixel, such that no light can pass directly from the backlight through the lens to exit pupil 208. If the lens is sufficiently weak, or negative, it does not focus the light on the exit pupil, see lens 206. However, if the lens is sufficiently positive, see lens 205, the light is focused to the exit pupil 208, which consequently emits light.

Figure 3:
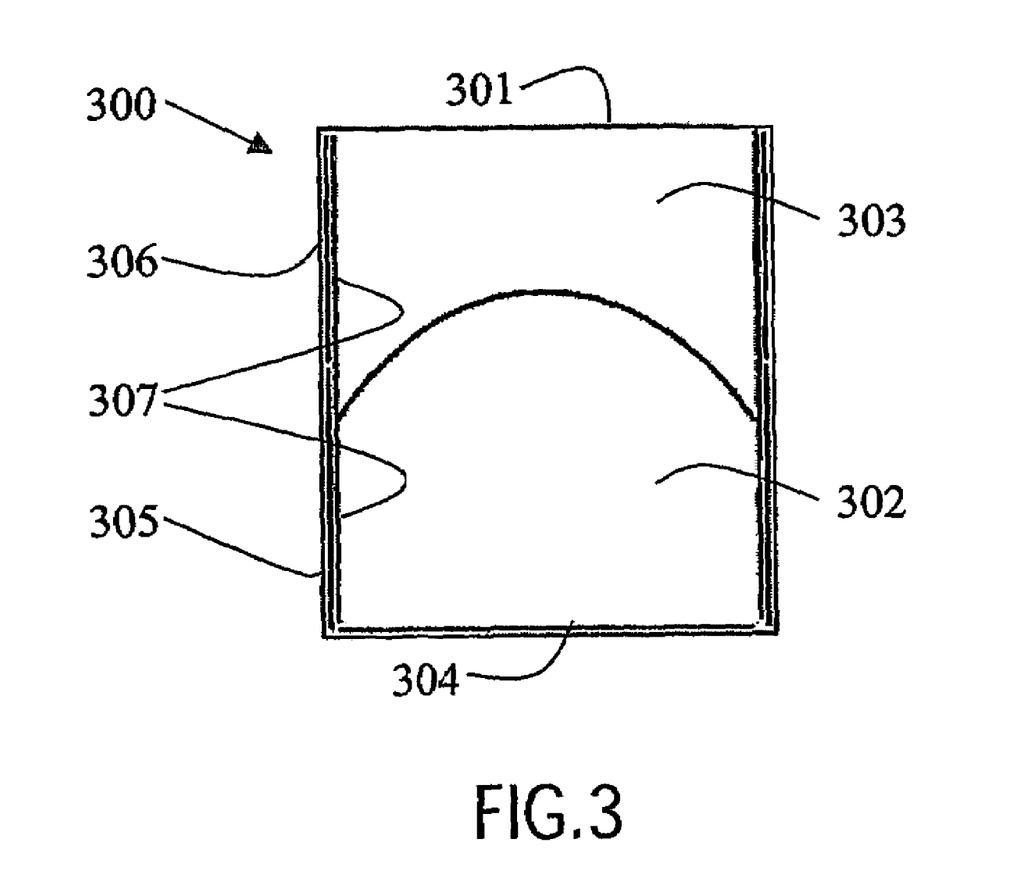
FIG. 3 illustrates a lens type electro-wetting pixel having a counter electrode, a retain electrode and an addressing electrode.

FIG. 3 shows an inventive electro-wetting lens, which provides a bistable driving configuration. In this bistable lens 300, there are three electrodes, a counter electrode 304, an address electrode 305, and a retain electrode 306, instead of two electrode as in prior art (compare with FIG. 1). The counter electrode 304 is in contact with the polar liquid 302 (e.g. water), and the address and retain electrodes 305, 306 are insulated by a hydrophobic coating 307 and positioned as drawn. As we will explain later on, the use of two electrodes hydrophobically insulated from the polar liquid 302 facilitates selection of a row in a display and individual addressing of the pixels in the row with the right information.

Figure 4:
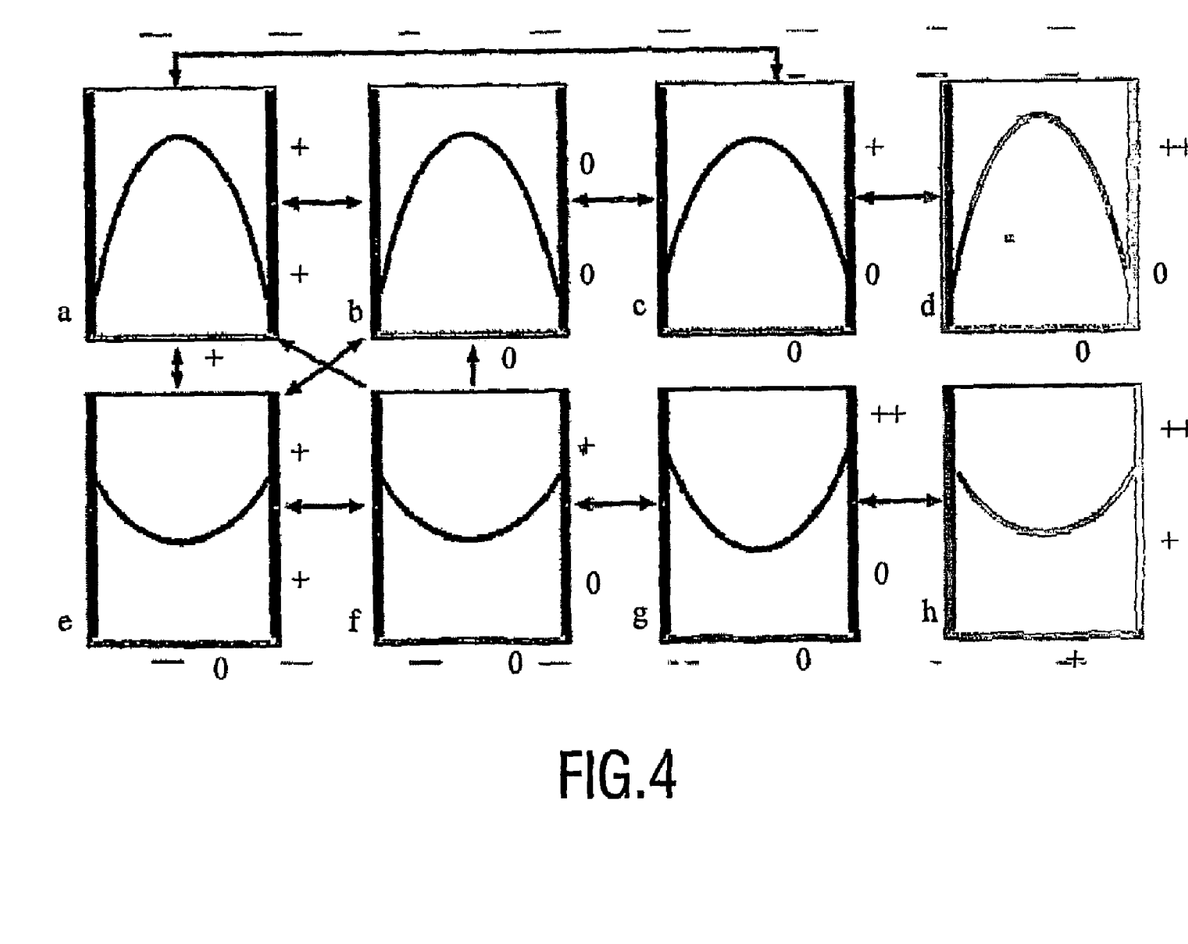
FIG. 4 illustrates possible states for a lens type electro-wetting pixel having three electrodes.

The bistability of the electro-wetting lenses having three electrodes will now be described with reference to FIG. 4, showing eight different potential configurations (states a-h).

First, consider state b in which a potential 0 is applied to all three electrodes and the interface is concave. If the potential at the retain electrode is changed to + or ++, the states change to c or d, respectively, but the interface stays concave since the polar liquid does not feel the retain electrode. On the other hand, if a potential + is simultaneously applied to the retain electrode and the address, the lens changes to state e and the interface changes to convex. This change is reversible: if we again change the potential of the retain and address electrodes to 0, the lens returns to state b and the interface becomes concave again.

Second, consider state f in which a potential 0 is applied to the counter and address electrodes, a potential + is applied to the retain electrode and the interface is initially convex. Even if the potential applied to the retain electrode is increased to ++, changing from state f to g, nothing happens with the interface. If we start from state g and increase the potential of the retain and address electrodes to +, again the interface will not change (state h).

Third, consider state a in which a potential + is applied to all three electrodes and the interface is concave. If the potentials applied to the retain and address electrodes are simultaneously switched to 0, nothing will change (state b). However, in case the switching is done sequentially and slowly in relation to the time scale at which the interface changes shape, the interface might turn convex and might stay concave.

So far, all discussed transitions are reversible. However, consider state f in which a potential 0 is applied to the counter and address electrodes, a potential + is applied to the retain electrode and the interface is concave. If the potential of the retain electrode is changed to 0, the interface becomes convex (state b). If we again increase the potential of the retain electrode to + the interface stays convex (state c). Since the same potential configuration is applied in state f as in state c, while the interface is either concave or convex, this configuration is bistable. The same irreversible transition occurs starting in state f and increasing the potential applied to the counter and address electrodes to +, thus ending in state a. In fact, since only the relative potential difference between the electrodes matters, the states a and b are in essence the same.

The cell is called bistable, since there are potential setting at which the interface can be either convex or concave. Examples are states f and c and states g and d.

Figure 5:
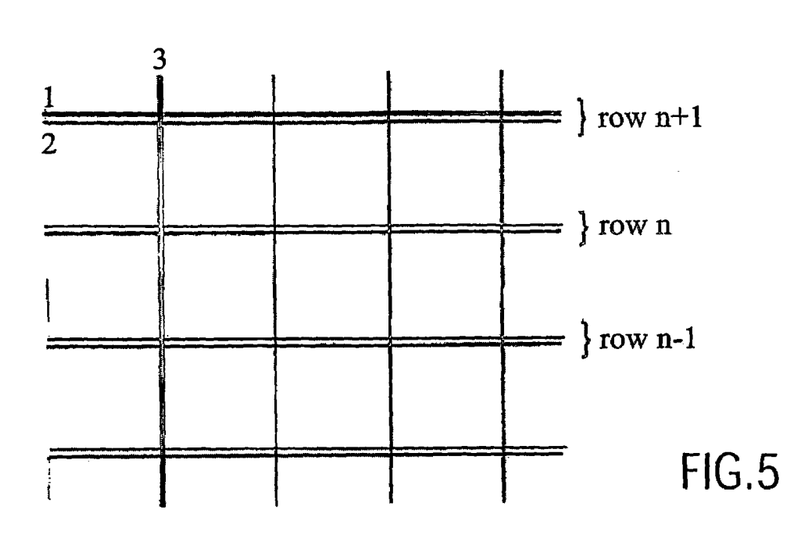
FIG. 5 illustrates an electrode circuitry for a passive matrix display using inventive electro-wetting pixels.

FIG. 5 schematically shows the circuitry for a passive matrix display. The counter and address electrodes are used as row electrodes (1 and 2) and the retain electrodes (3) are used as column electrode. In the following example, states c and f (that have convex and concave interfaces, respectively, but have the same potentials applied) will be used as the bistable "on" and "off" states of the pixel. During addressing, states d, g and h will be used to avoid unintended transitions in rows that are not selected.

Figure 6:
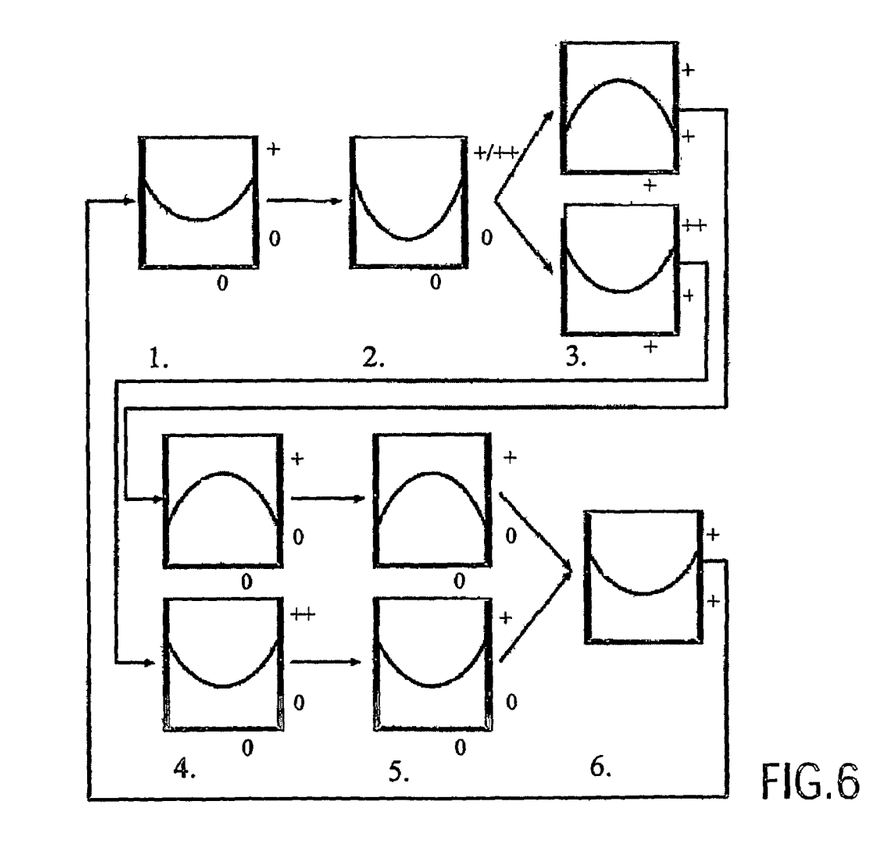
FIG. 6 illustrates possible steps for addressing a picture frame of a display having lens type pixels.

The selection and addressing of an inventive passive matrix display is explained by means of the scheme in FIG. 6:
1. At the beginning of each frame, all the pixels have a convex interface (state f).
2. Put the concave and convex ("on" and "off") information on the columns by applying a potential + or ++, respectively, to the retain electrode. A row that is already addressed is not altered by this potential change at the retain electrode. As explained above and illustrated in FIG. 4, the interface stays convex or concave (it merely changes from state c to d, or from state f to g, respectively).
3. We select a row by changing the row potential (the counter and address electrodes) to +. A cell that has a + on the retain electrode will change from convex to concave and a cell with ++ on the retain electrode will stay convex (it changes from state f to a or from state g to h).
4. We deselect the row by changing the row potentials from + to 0. As shown in FIG. 4, this does not alter the interfaces.
5. For the next row, go to step 2. If all rows are processed, the backlight can be flashed to generate light.
6. At the end of the (sub)frame, the display is reset by putting the potentials + on the address and retain electrodes and the potential 0 on the counter electrode, respectively. Thus, all lenses change to state e. A consecutive frame is addressed by returning to step 1.

Gray scales can be generated by means of any ordinary subfield method.

A passive matrix display based on electro-wetting lenses of the above type is relatively simple to manufacture. There are only a few components involved and the processing thereof is relatively simple.

Figure 7:
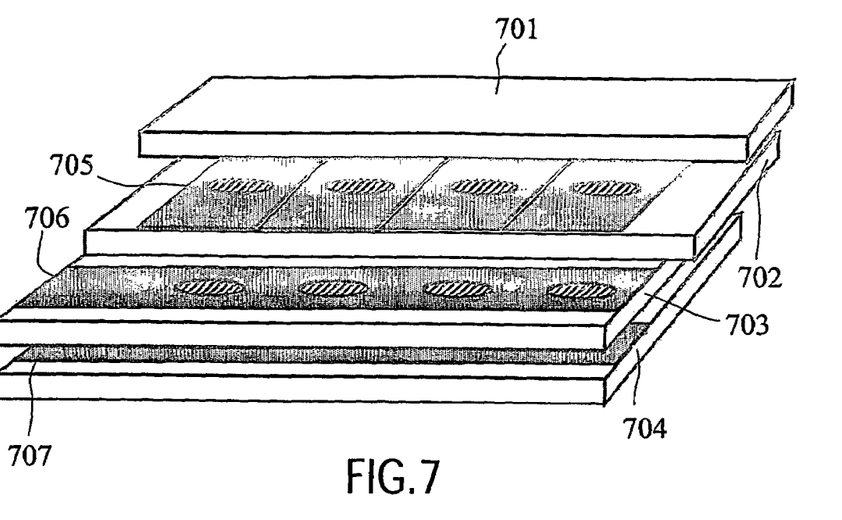
FIGS. 7 and 8 illustrates a possible construction for lens type pixels.

A possible construction is shown in FIG. 7. There are four plates 701, 702, 703, 704. The upper and the lower plate 701, 704 should be transparent. On the second and third plate 702, 703 address and retain electrodes 706, 705 are deposited. On the lower plate a transparent base or counter electrode 707 is deposited (for instance made of ITO, Indium Tin Oxide). The cells can be filled by means of an ink-jet printer, which can fill the cells with accurate amounts of the polar and non-polar liquids.

Additional measures to block the light, i.e. to improve the light shutting effect of the lens, can be provided on the top and bottom glass plates 701, 704. In addition, the bottom glass plate might also be part of the backlight.

Figure 8:
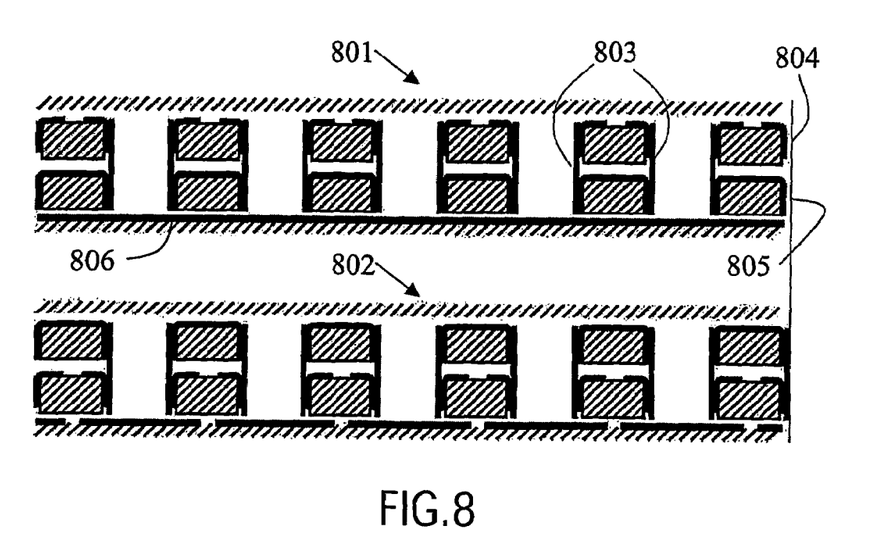

FIG. 8 shows the same type of pixels as shown in FIG. 7. Picture 801 is a cross section along a horizontal line (i.e. a row) of a pixel matrix and picture 802 is a cross section along a vertical line (a column) of the same pixel matrix. The pixels thus each have a hydrophobic coating 803, a counter electrode 806, being common to every pixel in each specific row, and an address electrode 805 and a retain electrode 804.

Type 2 (Filter Type)

In this type of display, the liquids have different levels of transparency and/or different color, and the liquids are thus functioning as a controllable light filter. Filter type pixels are particularly suited for electronic paper applications.

In case oil and water are used as liquids, the water might be clear, having a high degree of transparency, and the oil might colored, having a substantially lower degree of transparency. By means of the electro-wetting effect, the amount of oil blocking the light path of the pixel can be controlled. Covering the entire light path by oil turns the pixel dark, whereas removing the oil completely from the light path turns the pixel bright.

Figure 9:
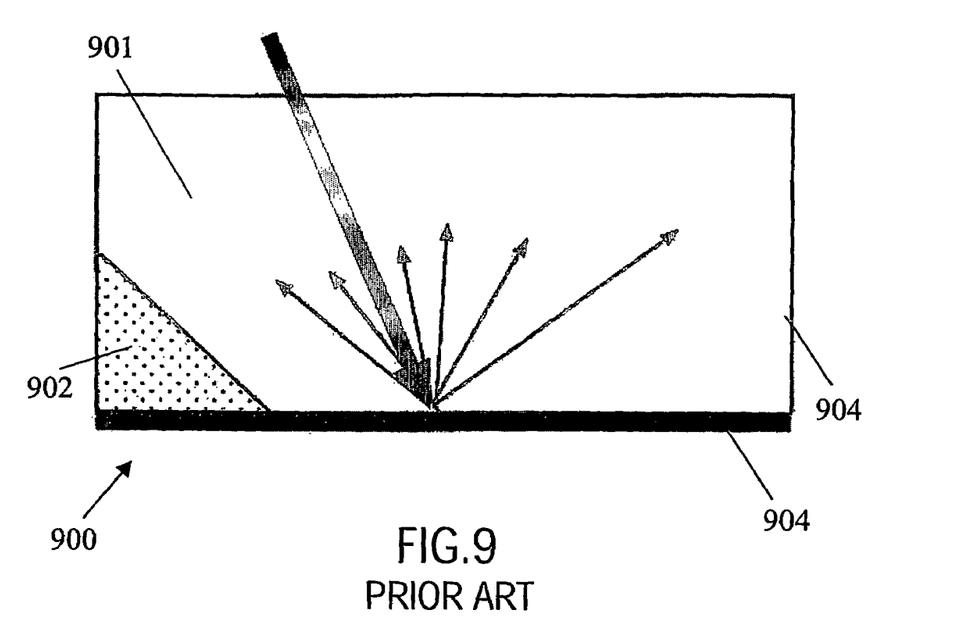
FIG. 9 illustrates a reflective light filter type electro-wetting pixel.
Figure 10:
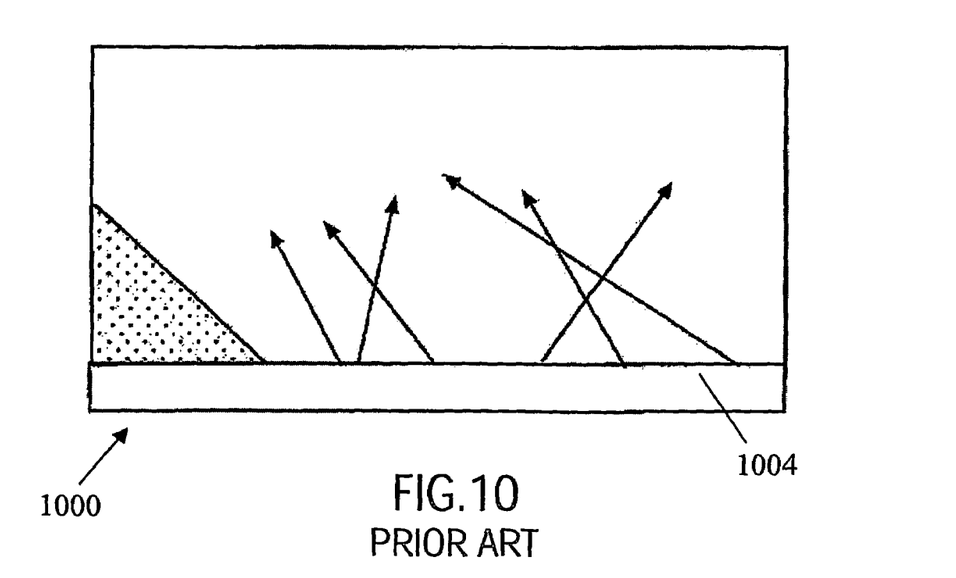
FIG. 10 illustrates a transmissive light filter type electro-wetting pixel.

FIG. 9 shows a prior art reflective pixel 900 of type 2 that is filled with transparent water 901 and dark oil 902. In the figure, the oil is moved to one side of the pixel cell 903, thus making the pixel bright. On the backside of the pixel, a reflector 904 is arranged. FIG. 10 shows a prior art transmissive pixel, similar to the pixel shown in FIG. 9 but having a back light arrangement 1004 instead of a reflector. Of course, it is also possible to manufacture transflective pixels using this type of pixel. In order to provide red, green and blue pixels, oil with the corresponding color might be used, alternatively a dark dye may be used in combination with color filters. In the latter case, a diffuse white reflective plate is placed behind the cells. If the oil is pulled to the side, the pixel reflects the ambient light. Otherwise the oil layer absorbs the ambient light.

Figure 11:
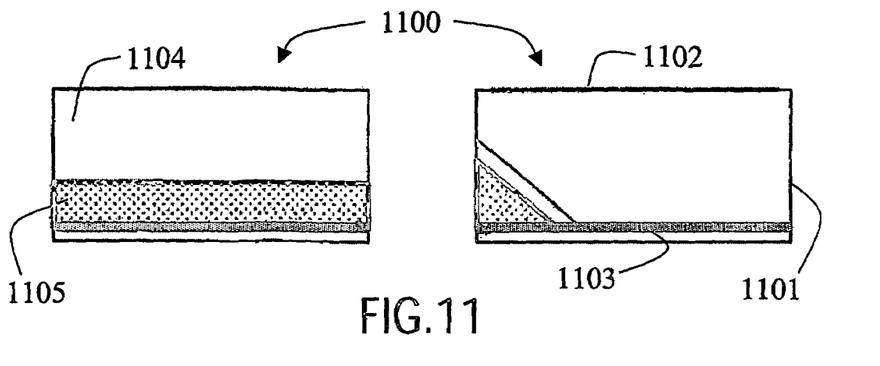
FIG. 11 illustrates a passive (left) light filter type pixel and an active (right) light filter type pixel.

The operation of a prior art electro-wetting pixel of type 2 will now be described with reference to FIG. 11. The pixel 1100 thus comprises a cell 1101 having a first electrode 1102 and a second electrode 1103, arranged at the top and bottom of the cell, respectively. The first electrode is in contact with transparent water 1104, and the second electrode is hidden behind a hydrophobic coating, in contact with dark oil 1105.

If no potential difference is applied between the electrodes 1102, 1103, the water minimizes its contact area with the hydrophobic coating. Consequently, the whole coating is covered by oil.

In case we apply a potential difference between the two electrodes, the contact area changes. The water and the second electrode form a capacitor and it is more favorable for the system to increase the contact area between the water and the hydrophobic coating. The water thus makes contact with the hydrophobic coating and the oil is forced away towards the corners of the system.

Figure 12:
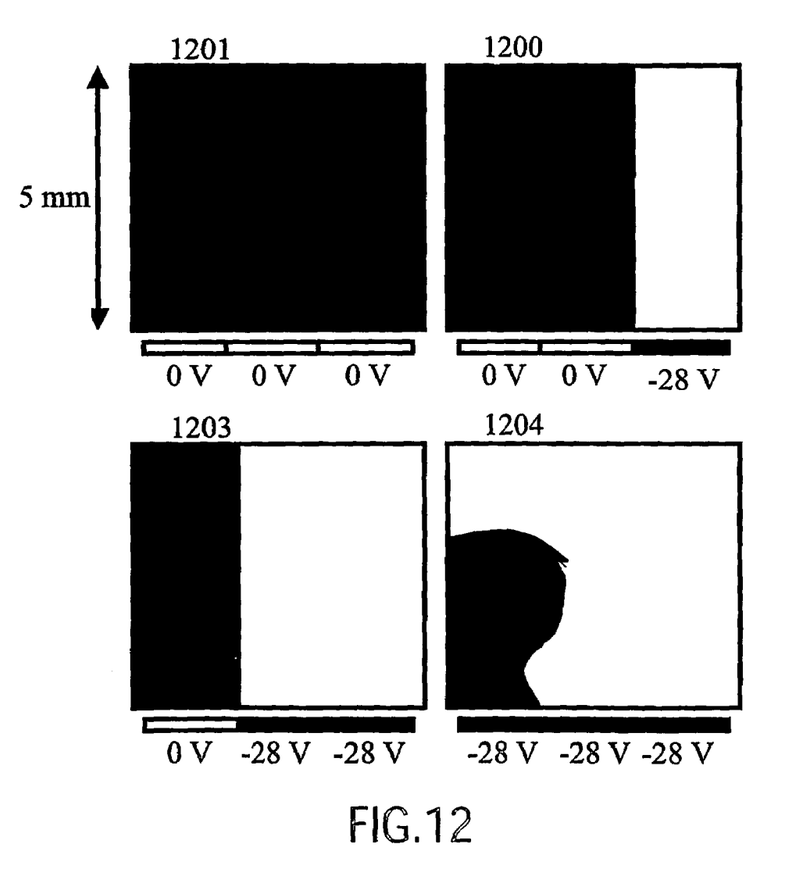
FIG. 12 illustrates a filter type pixel having three electrodes behind a hydrophobic coating, showing on, off, and gray states.

FIG. 12 shows top views of filter type pixels with three electrodes behind a hydrophobic coating in addition to a counter electrode (not shown), showing an on state 1204, an off state 1201, and two gray levels states 1202, 1203. In this particular embodiment, the potentials applied are −28 V, and the size of the pixel element is 5 mm×5 mm.

So, by means of electro-wetting the area of the lower electrode that is covered by the oil is adjustable by means of applying a single potential. In practice, it suffices to use a potential difference in the order of tens of Volts. The polarity of the potential difference is of no importance.

Figure 13:
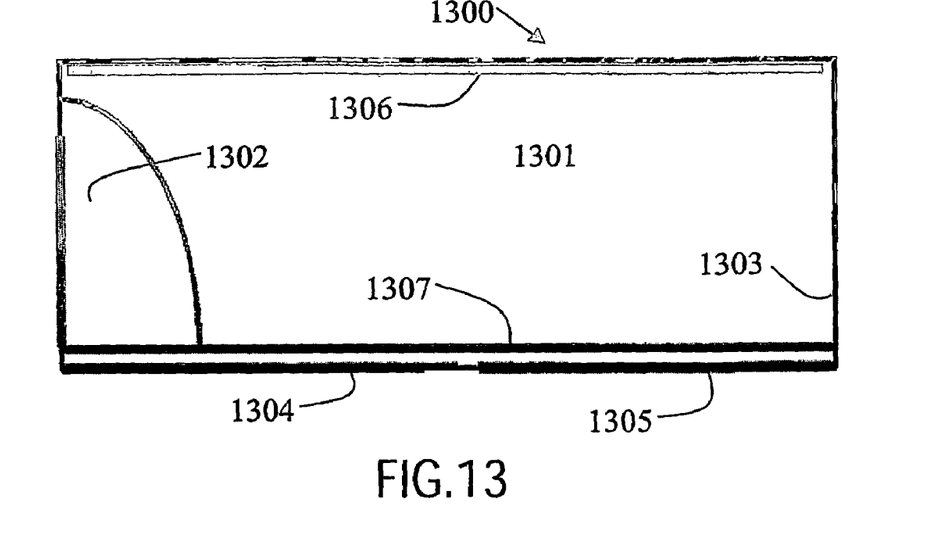
FIG. 13 illustrates an active light filter type electro-wetting pixel having an address electrode, a retain electrode and a counter electrode.

In the inventive, bistable electro-wetting pixel 1300, an additional electrode is arranged behind the hydrophobic coating, as illustrated in FIG. 13. The pixel thus comprises a cell 1303 that is filled with a polar liquid 1301, such as water, and a non-polar liquid 1302, such as oil. The pixel further comprises a counter electrode 1306, an address electrode 1304 and a retain electrode 1305, the two latter electrodes 1304, 1305 being coated with a hydrophobic coating 1307. Although different potentials can be applied to the three electrodes, only three potential levels, 0, + and ++, will be used in the following description: + denotes a potential higher than 0 and ++ denotes an even higher potential. The absolute value of the potentials is of no interest for the described mechanisms and principles.

Similar to pixel 900, the pixel 1300 provides two states. Either the oil 1302 is spread out across the pixel or it is pulled to the side of the pixel. According to the fundamental principle of the pixel, addressing is made by simultaneously applying a potential to the address electrode 1304 and the retain electrode 1305, in a sense using them as one single electrode. The difference as compared to prior art pixels is that the addressed state (be it an active or a passive state) of the pixel can be kept stable by means of a potential applied to the retain electrode 1305 only. The underlying idea is the same as for the above described Type 1 pixels: the triple point where the water-oil interface meets the hydrophobic surface is not (or at least not to any significant extent) affected by variations in the potential of the electrode that is completely covered by oil or water.

Figure 15:
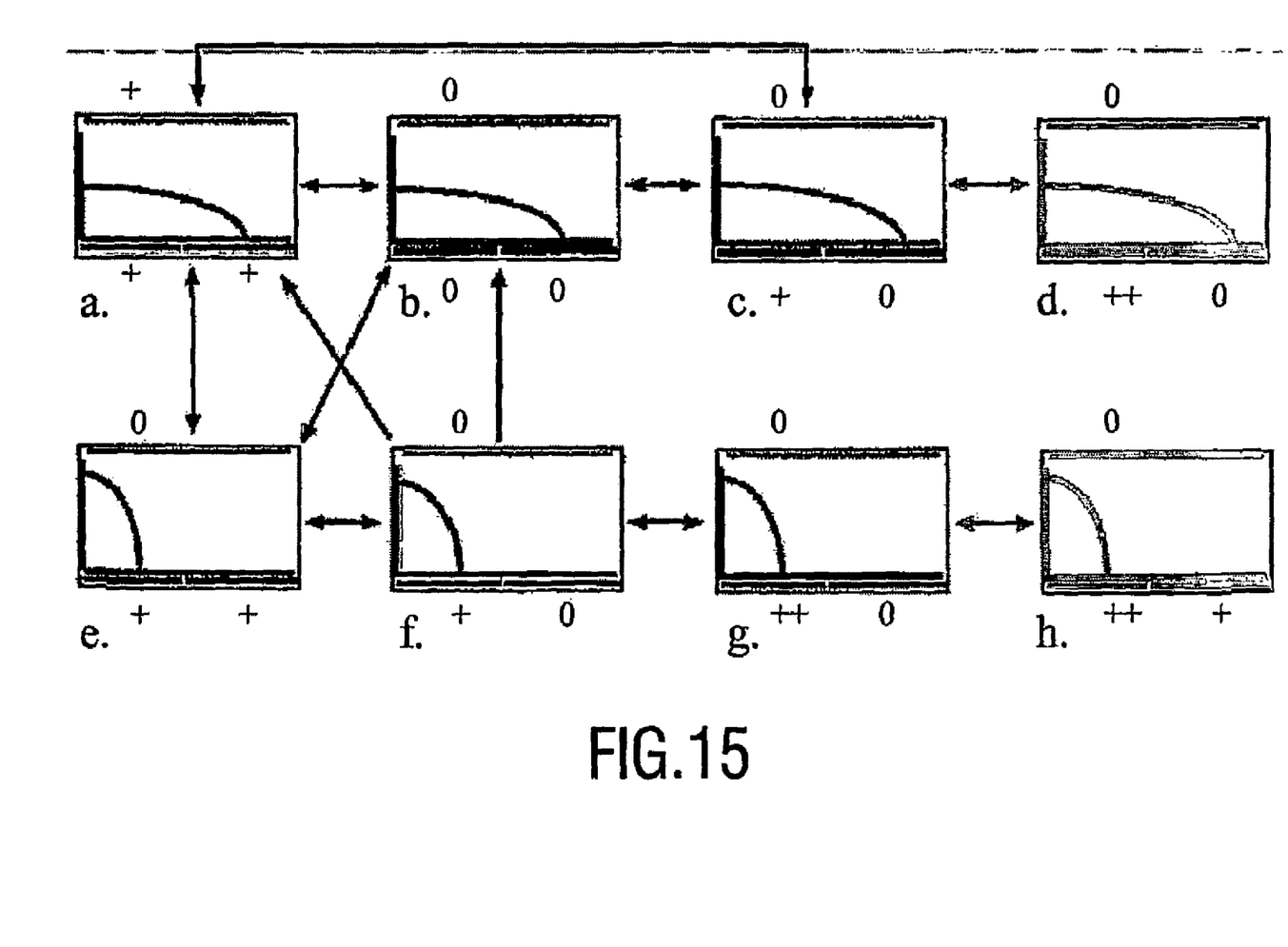
FIG. 15 illustrates possible states for a light filter type electro-wetting pixel having three electrodes.

The bistability of a type 2 electro-wetting cell having three electrodes will now be described with reference to FIG. 15.

Firstly, consider the situation in which we have applied a potential 0 to all three electrodes, state b. In this case, the oil is spread out (dark state). If we change the address electrode to + or ++, the pixel stays dark since the polar liquid does not feel electrode 3 (state c and d). On the other hand, if we apply a potential + to the address and retain electrodes, the pixel changes to the bright state e (the oil being collected at the side of the pixel). This change is reversible: if we return the potential of the address and retain electrodes to 0, the pixel returns to state b and thus becomes dark again.

Secondly, consider the situation in which a potential 0 is applied to the counter and retain electrodes and a potential + to the address electrode while the oil is collected to the side of the pixel (state f). If the potential applied to the address electrode is increased to ++, again nothing will happen (state g). If we start from state g and increase the potential of the counter and retain electrodes to +, again the interface will not change (state h).

Thirdly, consider the situation in which a potential + is applied to all three electrodes. For this situation, we have a dark state (state a). If we simultaneously switch the potentials applied to the counter and retain electrodes to 0, the interface will not change (state c). (In case we do this sequentially and slowly compared to the time scale at which the interface changes shape, we do not know what the final state will be: either light or dark).

So far, all discussed transitions are reversible. However, let us now consider state f in which a potential 0 is applied to the counter and address electrodes, a potential + is applied to the retain electrode, and the oil is collected to the side. If we change the potential of the retain electrode to 0, the oil spreads out (state b). If we again increase the potential of the retain electrode to +, the oil remains spread out (state c).

The same irreversible transition occurs starting from state f and increasing the potential applied to the counter and address electrodes to + (state a).

In conclusion, there are only a few potential changes that result in a transition from "oil collected to the side" (light) to "oil spread out across the pixel" (dark) and vice versa. Some of these changes are irreversible. These irreversible changes facilitates the robust bistability of the pixel, as will be further explained in the following. The cell is thus called bistable, since there are potential settings for which the pixel can be either light or dark, depending on their history of operation. Examples are states f and c and states g and d.

In the following the bistable states f and c (in which the oil is either collected to the side or spread out across the pixel, but the same potentials are applied) will be used as "on" and "off" states for the pixels. During addressing, the states d, g and h will be used in order to avoid transitions in rows that are not selected for addressing.

FIG. 5 shows an example of a pixel circuitry for a passive matrix display using the above-described pixels. The counter and retain electrodes are row electrodes and the address electrodes are column electrodes.

Figure 16:
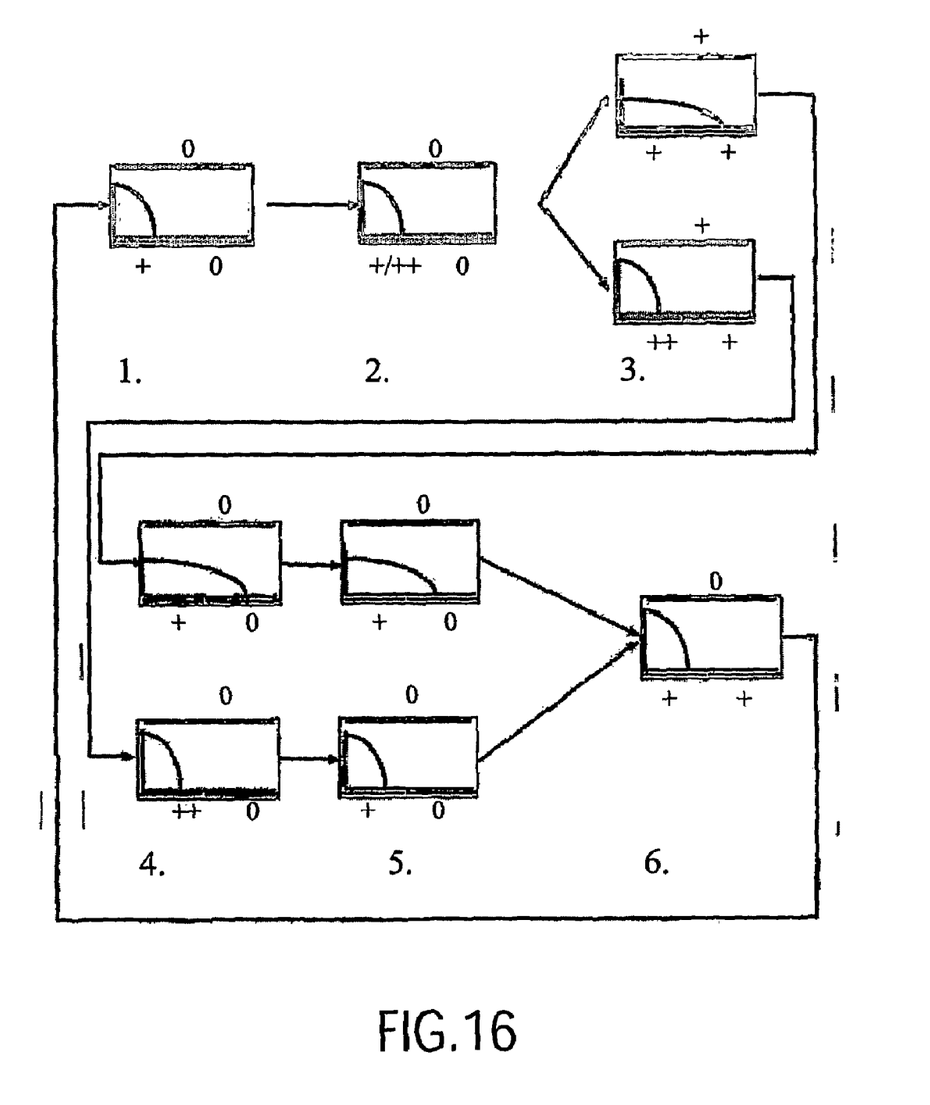
FIG. 16 illustrates possible steps for addressing a picture frame of a display having light filter type electro-wetting pixels.

The selection and addressing of a row is explained by means of the scheme shown in FIG. 16:

At the beginning of one frame, all pixels are "on", i.e. oil is collected to the side, state f.

Put the "on" or "off" information on the columns (address electrodes) for a row by applying a potential + or ++ for ON-addressing or OFF-addressing, respectively. A pixel in a row that is addressed already is not altered by this potential change of the address electrodes 3. As explained above and illustrated in FIG. 15 the oil distribution stays the same (it changes from state c to d, or from state f to g).

Select a row by changing the row potentials (counter and retain electrodes) to +. A pixel that has potential + its address electrode will change from ON to OFF and a pixel with potential ++ applied to its address electrode will stay ON (it changes from state f to a or from state g to h).

The row is deselected by changing its row potentials from + to 0. As shown in FIG. 15, this does not alter the oil distribution.

For the next row, go to step 2. If ails rows are processed, the backlight can be flashed to generate light (for the transmissive mode). For a reflective display, starting with all pixels in the "on" state reduces the contrast for video applications. However, for electronic paper like applications the display is only rarely addressed and this is not a problem.

At the end of the (sub)frame, the display is reset by putting the potential + on electrode 2 and 3 and the potential 0 on electrode 1 (thus, all cells change to state e).

Figure 14:
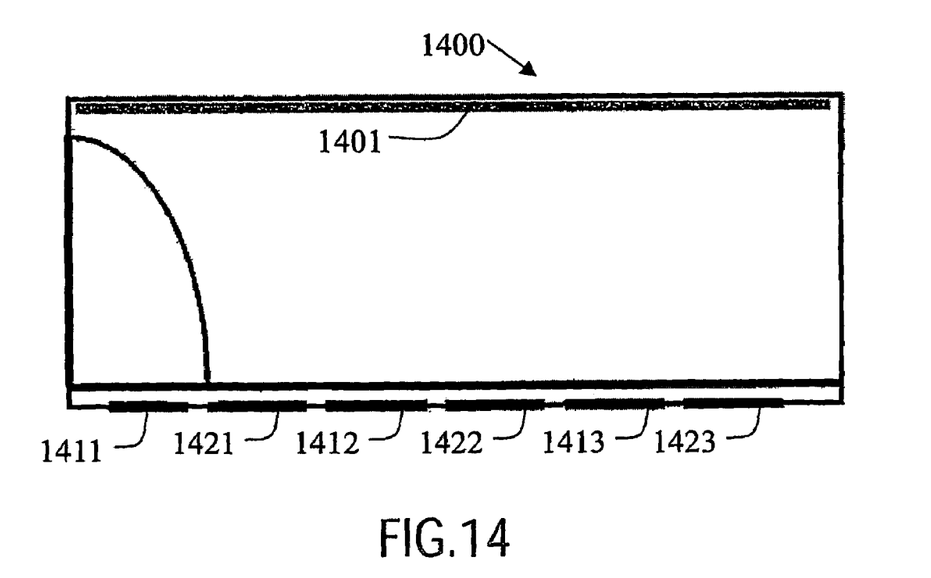
FIG. 14 illustrates a passive light filter type electro-wetting pixel having a series of address and retain electrodes and a counter electrode.

The idea of bistability may be extended to more than two states, thus providing for multi-stable gray levels, by increasing the number of address and retain electrodes below the hydrophobic coating. In principle one address and one retain electrode is needed for each multi-stable gray level. FIG. 14 shows a multi-stable pixel 1400 comprising one counter electrode 1401, three address electrodes 1411, 1412, 1413, and three retain electrodes 1421, 1422, 1423, and thus providing for three multi-stable gray levels. The address and retain electrodes forms consecutive electrode pairs (1411 and 1421; 1412 and 1422; and 1413 and 1423; respectively), each electrode pair consisting of one address electrode and one retain electrode and providing for one multi-stable gray level state (e.g. gray level state 1, 2 and 3, respectively, in addition to a passive state 0). In order to address such a pixel, a particular gray level is addressed by applying a potential to the corresponding electrode pair, as well as to any additional electrode pair that corresponds to a lower gray level state. For example, in order to address gray level 2, an address potential is applied to the electrode pairs that correspond to gray levels 1 and 2. The passive state is of course achieved by removing any potential from the electrodes. Once the pixel is addressed, it can be set to the multi-stable state by applying a retain potential to every retain electrode and removing any potential from the address electrodes. Doing this retains the pixel in its current state. The consecutive setup of the retain and address electrodes is needed in order to eliminate any cross talk between the various multi-stable pixel states. According to one embodiment, the retain pixels are electrically interconnected and thus provides for simplified addressing. It is also possible the have different sizes between the address and retain electrodes, depending of the particular pixel configuration.

A pixel having additional electrodes thus allows for passive matrix addressing with gray scales (instead of only "on" and "off"). However, gray scales can also be generated by means of a subfield method, or by a combination of subfield techniques and additional electrodes.

Additional gray levels can of course be provided for in the lens type pixels as well. In such case, the different gray levels correspond to various degrees of concavity or convexity of the lens, i.e. the light being more or less focused. The skilled man also realizes that the inventive ideas can be implemented on other types of electro-wetting pixel, which are not mentioned here.

A passive matrix display based on electro-wetting is simple to manufacture. A possible construction is as follows. There are three plates. The lower and upper plates should be transparent. On the lower plate the retain and address electrodes are deposited. These electrodes cross each other, therefore an insulated layer is necessary to avoid short circuits. The middle plate contains one hole for each cell (pixel) in which the liquids are deposited. On the upper plate, which is transparent (for instance ITO), the counter electrode is deposited. The cells can be filled by means of an inkjet printer. Such a printer can fill the cells with accurate amounts of polar and non-polar liquids. In addition, the bottom glass plate might also be part of a backlight or reflector, depending on the application (transmissive or reflective, respectively).

The inventive filter type pixel display is relatively simple to manufacture, even simpler than the lens modulating display referred to as Type 1. This is due to the fact that all electrodes are in the same plane as the display matrix. There are only a few components involved and the processing thereof is relatively simple. Furthermore, unlike the Type 1 pixels, there are no restrictions on the quality of the backlight, i.e. the light does not need to be collimated.

In summary, a display unit comprising electro-wetting pixels is provided. The inventive pixels provide bistable or multi-stable pixel states and thus facilitates passive matrix addressing. For this purpose an additional electrode is arranged for each multi-stable state. Consequently, each pixel comprises one counter electrode and at least one pair of address and retain electrodes. In order to activate a pixel, an address potential is applied to the address and retain electrodes in relation to the counter electrode, and in order to deactivate a pixel the potential is removed. In order to retain a current pixel state a retain potential is applied to only the retain electrode in relation to the counter electrode; the current pixel state, be it active or passive, will then be preserved and the retain potential configuration thus provides a bistable pixel state.

The invention claimed is:

1. A display unit comprising at least one electro-wetting pixel, each electro-wetting pixel comprising:
    a closed cell;
    a polar liquid and a non-polar liquid, said liquids being immiscible, having different optical properties and being contained in said cell;
    a counter electrode; and
    at least one electrode pair, each electrode pair comprising an address electrode and a retain electrode, said address and retain electrodes being separated from said liquids by a surface that is lyophobic in relation to only one of said liquids; and
    wherein said address and retain electrodes are arranged at respective electric potentials to control a spatial distribution of said liquids and thereby defining a multi-stable pixel state, and
    wherein a current state is retained by applying a potential to the retain electrode in relation to the counter electrode and removing any potential from the address electrode in relation to the counter electrode.

2. The display unit according to claim 1, wherein said at least one electrode pair is arranged to provide one active multi-stable pixel state.

3. The display unit according to claim 1, further comprising a control unit which is operative to
    apply potentials to the address and retain electrodes in relation to the counter electrode of each pixel; and to
    set each pixel in either of at least one active multi-stable pixel state, by means of an address potential applied to said address and retain electrodes in relation to the counter electrode of the respective pixel, and a passive multi-stable pixel state, by means of removing any potential from the address and retain electrodes in relation to the counter electrode of the respective pixel; and to
    retain a current multi-stable pixel state in each pixel by means of applying a retain potential to each retain electrode only of the respective pixel.

4. The display unit according to claim 1, wherein the display unit comprises a plurality of pixels and wherein the pixels are arranged along rows and columns in a matrix configuration.

5. The display unit according to claim 1, wherein each pixel further comprises at least one additional electrode pair, each pair comprising a retain electrode and an address electrode, wherein the address and retain electrodes in each pixel are consecutively arranged so that the address electrodes are spatially separated from each other by retain electrodes and vice versa, and wherein each electrode pair provides for a multi-stable pixel state.

6. The display unit according to claim 5, wherein the retain electrodes within each pixel is electrically interconnected with each other.

7. The display unit according to claim 4, wherein every retain electrode within each pixel arranged along the same row is electrically interconnected with each other.

8. The display unit according to claim 4, wherein every counter electrode within each pixel arranged along the same row is electrically interconnected with each other.

9. The display unit according to claim 1, wherein said liquids in each pixel have different indices of refraction and define a lens and wherein each pixel state is controlled by said lens.

10. The display unit according to claim 9, further comprising a light guide, and wherein said electrodes are operative to move the lens between an ON state in which the lens is operative to focus light from the light guide towards an exit surface of the cell and an OFF state in which the lens is operative to spread light from the light guide away from the exit surface.

11. The display unit according to claim 1, wherein said liquids have different light filtering properties and wherein the spatial distribution of the liquids provides a controllable light filter which defines said pixel state.

12. A method for bistable addressing of at least one electro-wetting pixel, each pixel comprising an address electrode, a retain electrode and a counter electrode,
- in which an active state is set by applying a potential to the address electrode and the retain electrode in relation to the counter electrode; and
- in which a passive state is set by removing any potential from the address electrode and from the retain electrode in relation to the counter electrode; the method further comprising the step of
- retaining a current state by applying a potential to the retain electrode in relation to the counter electrode and removing any potential from the address electrode in relation to the counter electrode.

13. The method for bistable addressing according to claim 12, wherein a plurality of pixels in a display device are addressed during picture frames, the method comprising the consecutive steps of:
- setting each pixel to the active state;
- setting a subset of said pixels to the passive state; and
- retaining each pixel in the current state.

14. The method for bistable addressing according to claim 12, the pixels being arranged in a matrix having rows and columns and the pixels being addressed one row at a time.

* * * * *